CONTROL SIGNAL GENERATOR FOR A COMPUTER APPARATUS

Original Filed Sept. 30, 1959 5 Sheets-Sheet 1

INVENTOR.
JOSEPH J. EACHUS
BY Henry L. Hanson
ATTORNEY

Oct. 3, 1967 J. J. EACHUS 3,345,611

CONTROL SIGNAL GENERATOR FOR A COMPUTER APPARATUS

Original Filed Sept. 30, 1959 5 Sheets-Sheet 2

INVENTOR.
JOSEPH J. EACHUS
BY Henry L. Hanson
ATTORNEY

CONTROL SIGNAL GENERATOR FOR A COMPUTER APPARATUS

Original Filed Sept. 30, 1959 5 Sheets-Sheet 3

INVENTOR.
JOSEPH J. EACHUS
BY Henry L. Hanson
ATTORNEY

Oct. 3, 1967 J. J. EACHUS 3,345,611

CONTROL SIGNAL GENERATOR FOR A COMPUTER APPARATUS

Original Filed Sept. 30, 1959 5 Sheets-Sheet

INVENTOR.
JOSEPH J. EACHUS

BY Henry L. Hanson

ATTORNEY

CONTROL SIGNAL GENERATOR FOR A COMPUTER APPARATUS

Original Filed Sept. 30, 1959 5 Sheets-Sheet 5

INVENTOR.
JOSEPH J. EACHUS
BY Henry L. Hanson
ATTORNEY

United States Patent Office 3,345,611

Patented Oct. 3, 1967

3,345,611

CONTROL SIGNAL GENERATOR FOR A COMPUTER APPARATUS

Joseph J. Eachus, Cambridge, Mass., assignor to Honeywell Inc., a corporation of Delaware Original application Sept. 30, 1959, Ser. No. 843,515, now Patent No. 3,157,862, dated Nov. 17, 1964. Divided and this application Apr. 10, 1964, Ser. No. 363,042
2 Claims. (Cl. 340—172.5)

This application is a division of an application entitled, "Controller for a Computer Apparatus," by Joseph J. Eachus, Ser. No. 843,515, filed Sept. 30, 1959, now Patent No. 3,157,862 which is assigned to the assignee of the present application.

A general object of the present invention is to provide a new and improved computer apparatus. More specifically, the present invention is concerned with a new and improved programmed computer apparatus having a program sequencer whose presence in the system is characterized by the simplicity with which the sequencing of a program can be effected, and the flexibility that can be achieved by way of the sequencer in changing the order structure of the computer apparatus.

The present computer apparatus is of the general-purpose-programmed type falling into the specific classification of a microprogrammed computer. A microprogrammed computer may be termed as a computer wherein a plurality of data manipulating functions are built into the logic of the computer apparatus and certain combinations of these may be combined to provide a predetermined order which may be an integral part of a complete program. This is to be contrasted with certain types of programmed computers wherein a predetermined order structure is prewired into the logic of the system at the time that the system is built, and the order strucure can be changed only by substantial modification of the logic of the entire system.

As contemplated in the present invention, a microprogrammed computer apparatus is provided which has built therein certain basic logic representing individual steps which can be readily combined to form orders of any desired complexity. This flexibility is achieved by the unique arrangement of the computer logic with a computer sequencer which is adapted to provide gating and control signals for combining the individual logical functions into a predetermined order structure in accordance with the logic established within the sequencer.

One of the particular advantages achieved in the present invention is a computer configuration which permits the construction of a sequencer in a single logical unit which, in practice, can be changed by removing the same from the circuit and replacing with another having preformed logic to select a different sequence of steps in order to provide a different order structure for the basic computer.

It is accordingly a further more specific object of the present invention to provide a new and improved computer apparatus having a set of fixed logic and a sequencer therefor which is adapted to combine the fixed logic in accordance with preselected logic arranged within the sequencer in order to effect the performance of the desired program.

The sequencer used in the present apparatus is of the type which is capable of automatically stepping through a series of programmed steps once a particular control combination has been established within the sequencer. It has been found that the implementation of the sequencer can best be achieved by the use of saturable magnetic core elements arranged in an electrical circuit so that one or more of the magnetic core elements may be selectively and sequentially established in a predetermined non-saturated state or saturated state to provide a desired control action on an output winding or windings associated therewith.

As the invention is described more fully hereinafter, the core elements may be arrayed in a predetermined manner with control or saturating wires leading through certain combinations of cores and with suitable current sources connected to the saturation wires or control wires so that predetermined saturated states may be established within the core elements of the combination. By sensing the core elements which are in a predetermined state, which may be a non-saturated state, it is possible to provide a feedback from a sensing apparatus which will switch the active current sources on the control or saturating wires leading through the cores. This can be used in turn to select a further core in the combination so that in actual operation a series of cores may be selected in any desired combination in accordance with the feedback signals that are generated from the cores themselves. By associating the output of each individual core with certain control operations of the main computer, it is possible to cause the computer to step or sequence through a series of logical operations to perform a desired control function.

It is therefore a further object of the present invention to provide a new and improved sequencer for a programmed computer wherein the sequencer comprises a plurality of magnetic core elements arranged in a circuit with feedback connections for effecting a predetermined sequential selection of the cores in the circuit to thereby provide signals for sequencing the operation of the computer.

Under certain types of operations of a programmed computer, it is desirable to perform in a repetitive manner certain steps or orders in order to carry out a predetermined computing or data processing operation. The present computer sequencing circuit has the facility of readily providing this repetitive sequencing type operation by appropriately selecting the feedback connections within the sequencer so that a series of cores may be selected in sequence and then the sequence may then be repeated until such time as a predetermined control signal combination is received from the computer, indicating that the sequencer can advance on to the next sequencing step outside of the repetitive combination.

It is therefore a further object of the present invention to provide a new and improved sequencer for a computer wherein the sequencer is capable of selectively performing repetitive operations within the sequencer.

In other forms of operation, it is essential that the sequencer which, in effect, controls the computer program also be programmable in the sense that a particular sequence may be established in the computer from an external source, which may either be the computer proper or from a manual source. Further, the sequencer must have the ability to perform certain sub-sequence steps under conditions of manual direction or under conditions of computer direction.

It is therefore a still further object of the invention to provide an improved sequencer for a computer which is adapted to automatically provide sub-sequence operations under the direction of automatic or manual control in accordance with the sequence steps performed in a major program.

The foregoing objects and features of novelty which characterize the invention, as well as other objects of the invention, are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

For purposes of explanation, the principles of the present invention are illustrated and described in connection with an industrial process control system of the type illustrated in FIGURE 1. While the invention is shown in its basic environment in an industrial process control configuration, the principles thereof are applicable to any type of computing or data processing system wherein the operation is performed in accordance with predetermined programmed steps.

Figure 1:
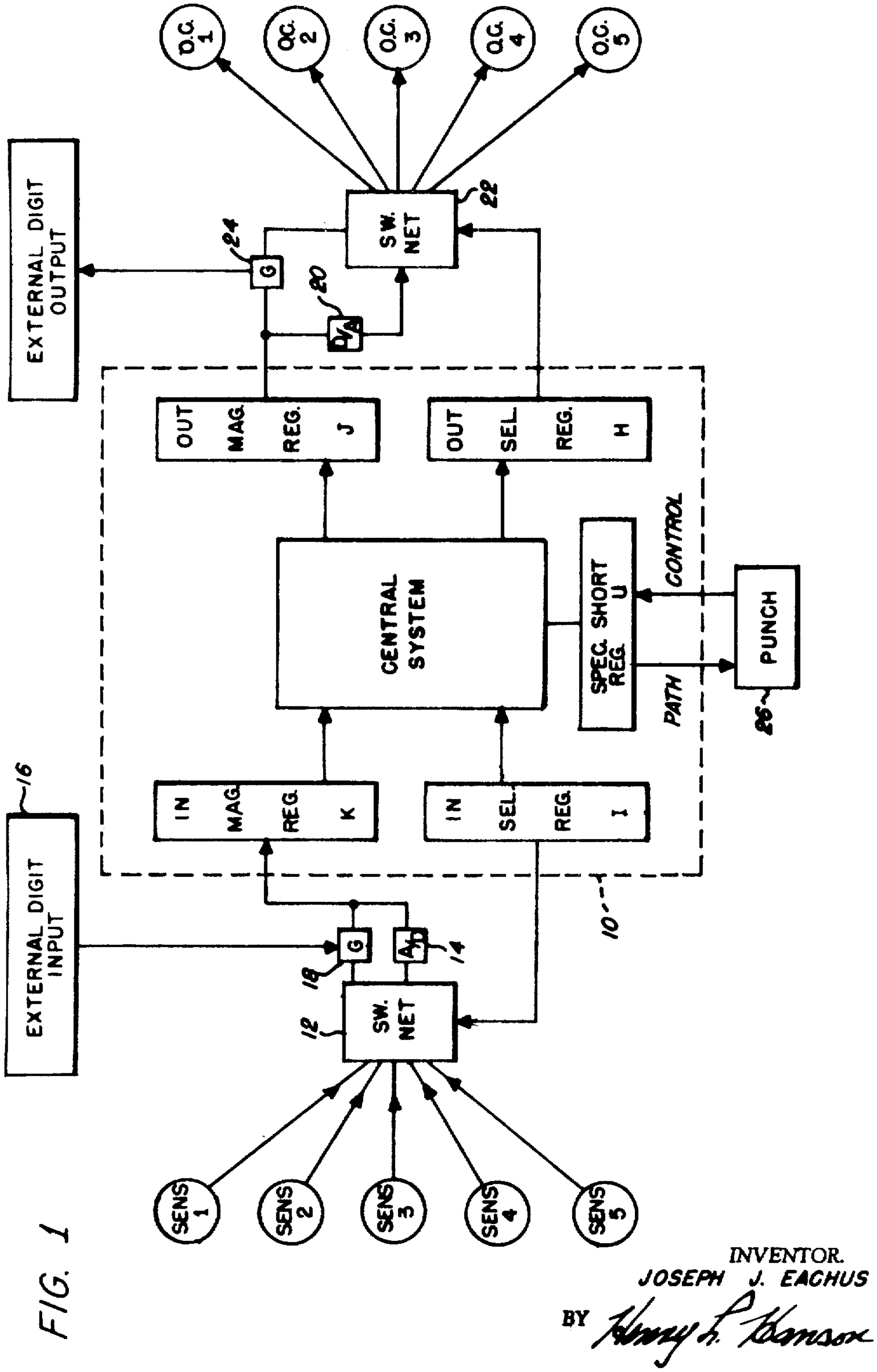
FIGURE 1 is a diagrammatic representation of an industrial process computer using the principles of the present invention.
Figure 4:
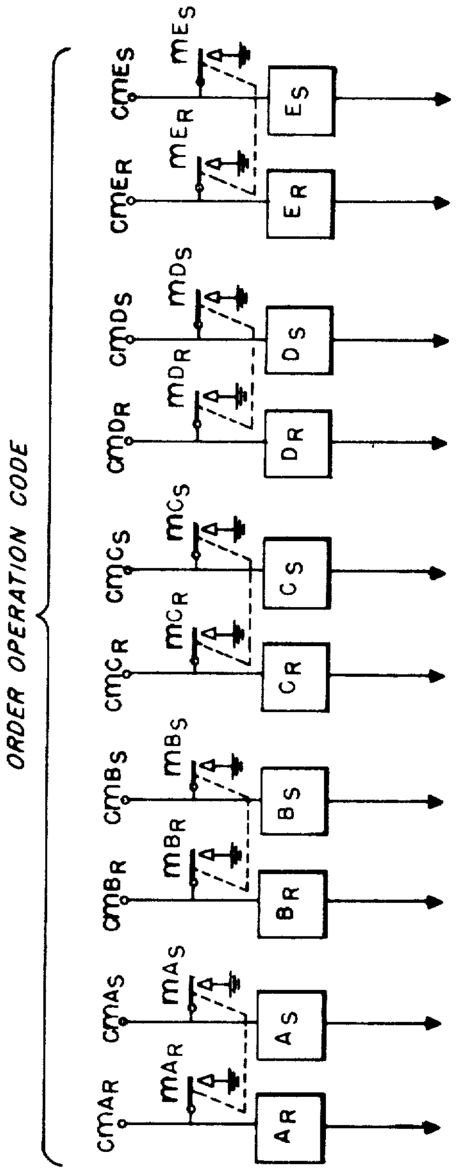
FIGURE 4 illustrates a communicating register between the central machine, a manual register, and the sequencer for the computer.

Referring to FIGURE 1, the numeral 10 identifies a computer system of the type more fully described hereinafter. Associated with the input of the computer 10 are a plurality of analog sensing devices 1 through 5 which are connected through a suitable switching network 12 to an analog-to-digital converter 14. It is assumed that the outputs of the sensing devices 1 through 5 are analog signals which may be appropriately selected by the switching network 12, and then inverted into digital signals by the analog-to-digital converter 14. The output of the analog-to-digital converter 14 is connected to the input of the computer 10 by way of an input magnitude register K. In addition to the input from the switching network 12, a further input may be provided by an external digit source 16, which is gated by way of the gate 18 and the network 12 into the input magnitude register K. The selection, or operation, of the switching network 12 may be controlled by the computer in accordance with signals derived from the input selection register I. A manual input may also be provided using switches as illustrated in FIGURE 4.

Figure 2:
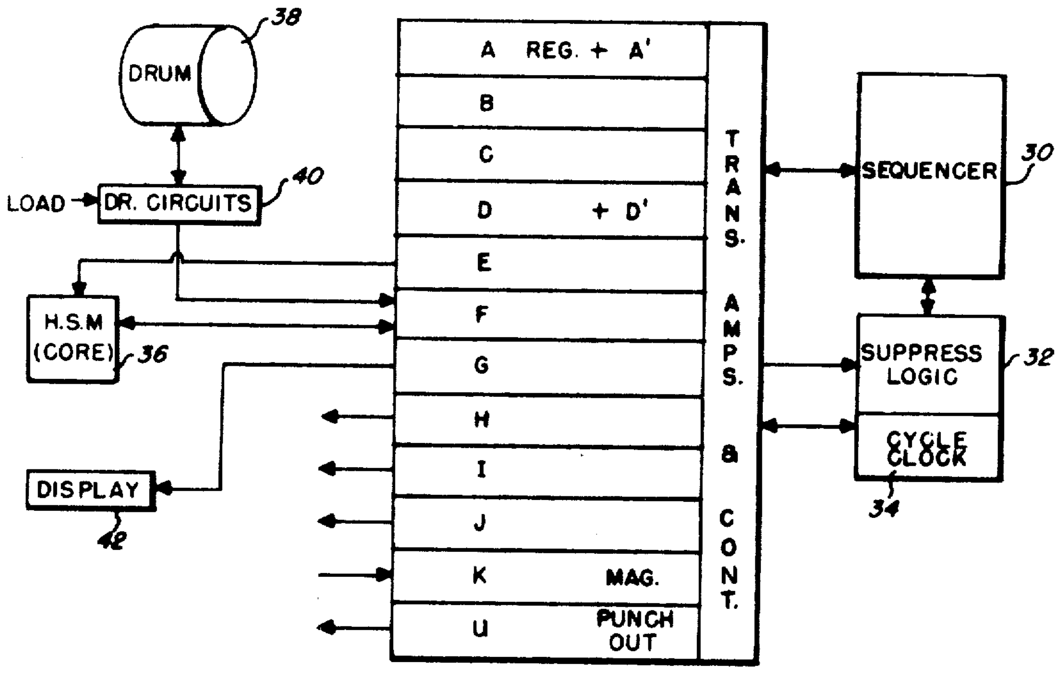
FIGURE 2 shows the general organization of the central system of the computing portion of the system illustrated in FIGURE 1.

An output of the computer is by way of the output magnitude register J, which is adapted to apply the output digital signal from the computer to a digital-to-analog converter 20. The digital-to-analog converter 20 is in turn connected to an output switch network 22, which is under the control of the output selection register H of the computer. The switching network 22 is adapted to connect the output to an appropriate output control device, OC1 through OC5. The gate 24 may also be used with the switching network 22 to provide an external digital output. Additional outputs may be as illustrated in FIGURE 2.

Also associated with the output of the computer 10 may be a punch 26 which is adapted to receive data from the special output register U of the computer. The control signals may be derived from the punch or from the computer.

It is assumed herein that the computer 10 is a programmed computer of the type having a stored program which may be called into operation under the control of an operator. A typical operation for the computer in a process control system as illustrated in FIGURE 1 will comprise the derivation of a control signal within the computer 10, which will be operative by way of the input selection register I to select through the switching network 12 an analog signal from one of the sensing elements 1 through 5. If the sensing element 1 is the selected sensing element, the analog signal on the output thereof will be applied by way of the switching network to the analog-to-digital converter 14. The digital output of the converter 14 will be received in the input magnitude register K and may then be transferred into the central system of the computer.

It is assumed that once an input is received in the register K, it may then be transferred to a suitable point within the central system in order to effect the desired processing operation. For example, if the signal coming in from the sensing element is a temperature signal, the magnitude of the temperature signal may be compared by way of a digital comparison with a reference signal in the computer system, and in the event that there is a deviation of the temperature signal from the desired norm, the actual deviation will be determined and compared with the over-all process parameters to determine the type of output signal that should be sent to the process controller, or output control associated with the system. Once the appropriate calculation has been made, the digital signal will then be applied to the magnitude register J where it may then be passed by way of the digital-to-analog converter 20 to the switching network 22, and from there to the output control device 1, or whatever other control devices may be associated with the particular sensing element that has been examined. The output signal may then be utilized by the output control to effect a desired control action, such as to adjust a fluid valve or a steam valve in a process so that any temperature deviation for the temperature sensed can be appropriately corrected in an optimum manner.

The system, as illustrated in FIGURE 1, may be arranged to scan a large number of different variables and provide appropriate output signals to the associated control devices in order to maintain a process under complete control, using a single computing system.

Inasmuch as it is desirable in certain data processing operations to record signals indicative of the magnitude of the variables being sensed, these variables may be appropriately selected by way of the computer and the digital representation of the sense variable may be utilized to activate the punch 26.

Referring to FIGURE 2, there is here illustrated the manner in which the central system, including the registers, is organized. The central system includes a plurality of parallel registers A through K, each of which are, for example, eighteen bits long. The additional punch-out register U is provided for use when a digital readout is to be effected by way of the punch 26. In addition, the register A and the register D include two additional bit positions at A′ and D′.

All of the communication between the registers is effected by logical gating circuits. The majority of the transfers between registers is effected by way of a set of transfer amplifiers for effecting the transfer in each bit position from one register to another in a manner more specifically discussed in connection with FIGURE 3. However, additional logic may be provided for direct communication between selected registers without going through the common transfer section and the extent to which this additional logic may be provided is determined by the degree of flexibility required of any particular central system.

In order to carry out the transferring of data between the registers of the central system, there is provided a sequencer for ensuring that the transfers and other logical operations performed are carried out in a predetermined order. The sequencing signals are derived from the sequencer 30. The sequencer 30 is under the control of the suppress logic circuits 32, the latter of which may well receive signals manually generated or signals generated within the central system. The stepping of the sequencer 30 is under the control of a cycle clock 34.

Storage for the central system may be provided by way of the high-speed coincident current core memory 36, and also by way of a drum 38. The drum 38 may be under the control of the drum circuits 40 for effecting the desired addressing, as well as the reading and writing of data from the drum. In addition, visual display circuits may be provided as by way of a display unit 42.

Registers A and B are general-operation registers. The register C may be termed a command register which functions as a sequence register. Inasmuch as the register is a sequence register, logic is provided within the circuit for adding one unit to the contents thereof under certain logical conditions.

The register D may be operated as an arithmetic register so that the register may be utilized as an addition or subtraction register. The register E may be operated as a general register, and also as a memory address register. The register F may be designated the memory local register. Register G is the display register of the system.

As discussed above, registers H, I, J and K are associated with the movement of data in and out of the system, while register U is the punchout register.

Figure 3:
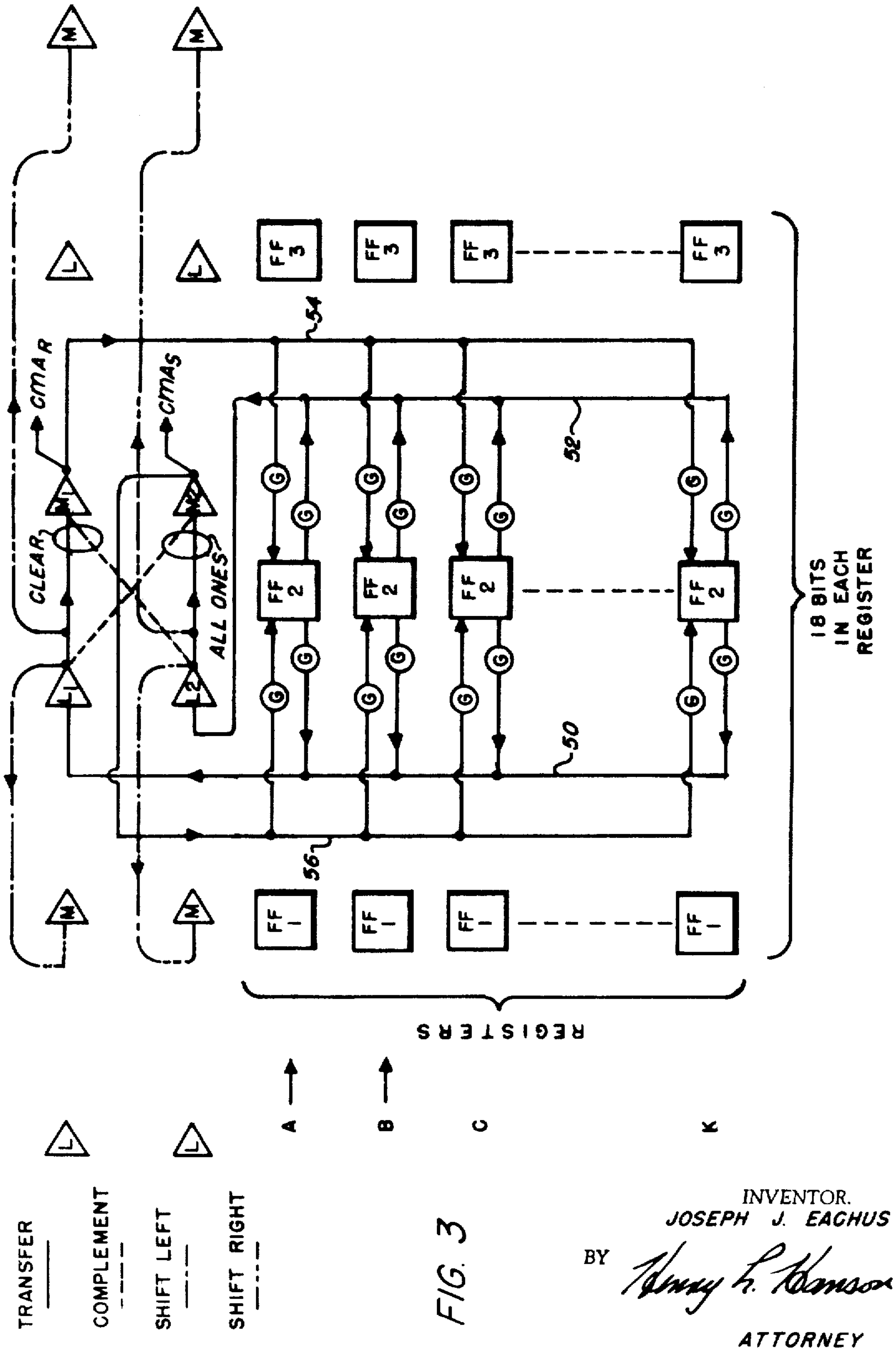
FIGURE 3 shows a preferred arrangement of the registers utilized in the central system of the computer.

FIGURE 3 shows the basic organization of the register A in greater diagrammatic detail. Each register is comprised of a plurality of flip-flops in accordance with a number of bits stored within the register. Thus, in an 18-bit register, there are eighteen flip-flops provided. Each of the flip-flops is provided with a gating circuit on the input as well as on the output. Further, each flip-flop within a particular bit position is arranged to communicate to a pair of output buses 50 and 52. The bus 50 leads to a transfer amplifier L1, while the output bus 52 leads to a transfer amplifier L2. Amplifiers L1 and L2 are arranged to communicate in a double bus manner with some other combination of a series of M transfer amplifiers in accordance with a particular processing operation to be performed. The logic between the L and M circuits is by way of desired combinations of "or" and "and" circuits, which are well known in the art. The transfer of the signals from the output bus 50 to the transfer amplifier L1, and from there to the transfer amplifier M1, would be termed a direct transfer. Similarly, a transfer from the bus 52 through the amplifier L2 and to the amplifier M2 would be termed a direct transfer. The output of the amplifiers M1 and M2 are connected to a pair of input buses 54 and 56, which are likewise communicating by way of suitable gating circuits to the flip-flops in the individual registers.

By transferring the output of the L1 and L2 amplifiers to the M amplifiers in the next bit position to the right, it is possible to provide for a shift-right of data. Similarly, if the output amplifiers L1 and L2 are transferred to the M amplifiers in the transfer section immediately left, a shift-left of data may be effected.

By combining the output of the amplifier L1 with the output of the amplifier L2 on the input of the amplifier M1, it is possible to clear data from the circuit.

By combining the output of L1 and the output of L2 on the input of the amplifier M2, it is possible to cause the data in the output to be "ones."

In order to complement the data within a register, the output of the L1 amplifier is transferred to M2, while the output of the L2 amplifier is transferred to M1. In all of the foregoing operations, it is assumed that a like operation takes place in the L and M amplifiers associated with all of the other bit positions in the register.

The flip-flop circuitry, the gating circuitry, as well as transfer amplifier logic, may be of the type illustrated in greater detail in a copending application of the present inventor entitled "Electrical Pulse Circuits," bearing Ser. No. 656,791, filed May 3, 1957.

The M transfer amplifiers, in addition to communicating with the input buses in individual bit positions across the register array, may also be provided with terminals for communicating with the sequencer. This latter communication may well be by way of the circuitry illustrated diagrammatically in FIGURE 4.

In considering the operation of the circuit of FIGURE 3, if there is a system word of eighteen bits in length to be transferred from register B to register A, the signals within the individual flip-flops are read out to the output gating circuits associated therewith onto the output buses, such as the buses 50 and 52. The words are then transferred to the L amplifiers and again to the M amplifiers back to the input buses 54 and 56. Upon the opening of the gating circuits on the input of the register A, the word will be transferred into the register A. Similar transfers may be made between the other registers of the combination.

The D register of the combination as illustrated in FIGURE 3 may well take the form of the register illustrated in a copending application of the present inventor entitled, "Information Manipulating Apparatus," bearing Ser. No. 701,435, filed Dec. 9, 1957.

FIGURE 4 shows representative means for communicating with the sequencer 30. Such a means may well include a manual register 60 comprising a set of switches as well as input terminals CMA through CME, which receive signals from the M amplifiers in the register array illustrated in FIGURE 3.

Figure 5:
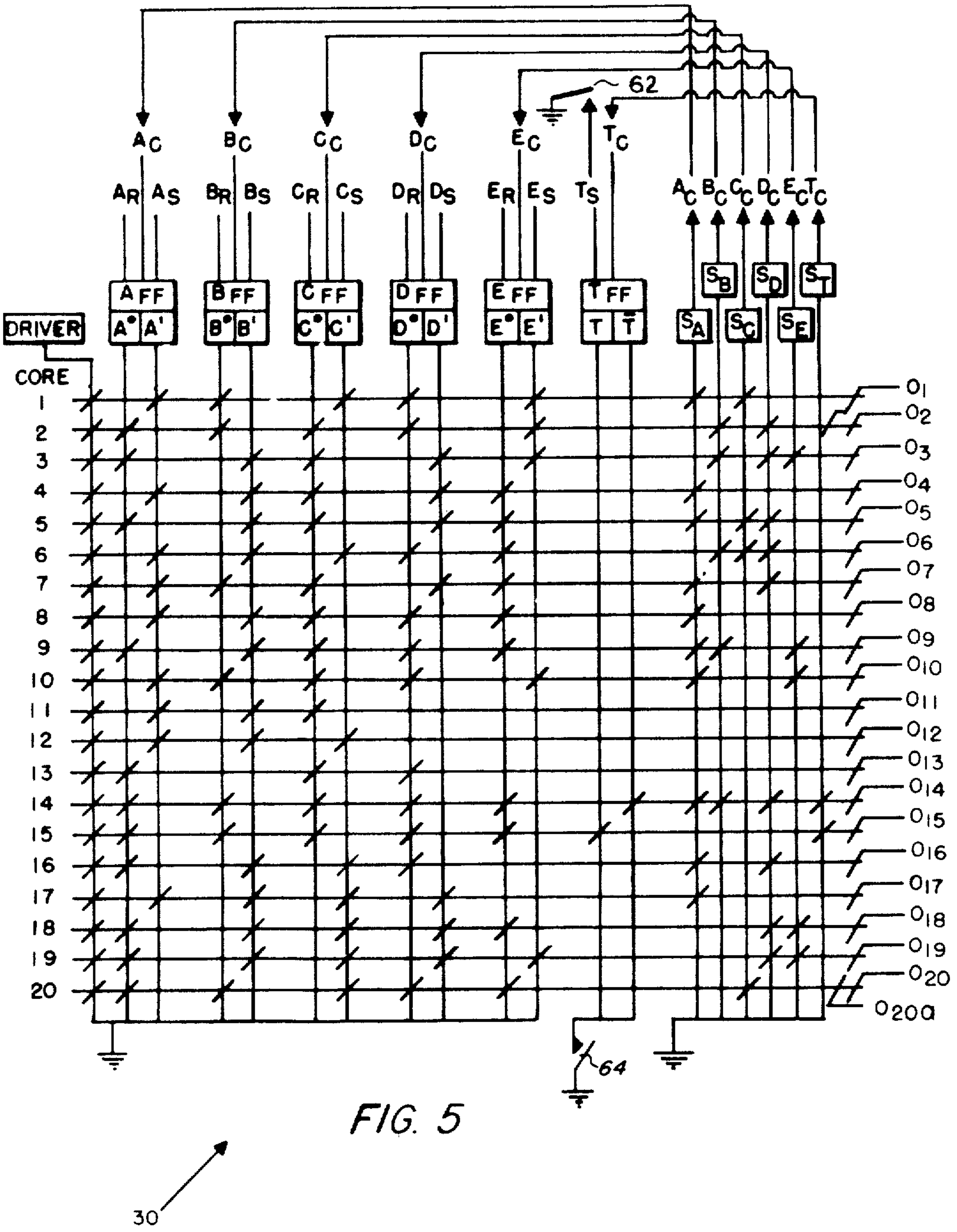
FIGURE 5 illustrates diagrammatically a representative type of sequencer which may be utilized to demonstrate the basic organization of the sequencer.

Suitable transfer circuits are provided for transferring the signals to the suppression flip-flops of the sequencer illustrated in FIGURE 5; these transfer circuits are adapted to produce signals $A_R$, $A_S$, through $E_R$ and $E_S$.

While the manual register 60 has been illustrated in the position shown in FIGURE 4, it will be apparent to those skilled in the art that this register may likewise be provided as a register in the main register combination illustrated in FIGURE 3.

Referring next to FIGURE 5, there is here illustrated in diagrammatic detail, a representation of a preferred embodiment of the sequencer which may be used with the computer. This sequencer as illustrated comprises a plurality of saturable core elements 1 through 20. Each of these core elements has associated therewith a plurality of wires which are adapted to selectively thread certain combinations of core elements to provide the desired control action within, as well as without, the sequencer. The wires used may be divided into four different groups. The first group is the suppression group which is adapted to receive control signals from a plurality of suppression flip-flops $A_{FF}$ through $E_{FF}$, and a further flip-flop $T_{FF}$. The second group of wires comprises the sense wires connected to the sense amplifier circuits $S_A$ through $S_E$ and $S_T$. Also associated with each of the core elements of the combination is a driver wire which is connected to a driver source receiving a control signal from the system clock. The final set of wires are the output wires $O_1$ through $O_{20}$, which are selectively associated with the cores of the circuit. A pair of switches 62 and 64 are provided for the purposes of manually selecting certain functions within the circuit. As illustrated in the drawings, a wire threading a core is as indicated by the slant coupling marker.

Considering the operation of the sequencer, it should first be noted that the outputs from the cores 1 through 20 by way of the wires $O_1$ through $O_{20}$ may be connected in any desired manner in order to effect the desired control operation within the central system, particularly insofar as transfers and the like are concerned. The output wires may well be arranged so that one output wire may thread several cores, such as the output wire $O_1$ threading both core 1 and core 2. There also may be several windings or output wires threading a common core, such as the windings $O_{20A}$ and $O_{20}$ on core 20.

In considering the operation of the sequencer, it is assumed that the cores 1 through 20 are arranged to be selectively activated in a predetermined sequence. A core which is considered activated is a core which is not saturated by any of the suppression wires passing therethrough at the time that a signal is applied thereto by the driver wire that threads all of the cores. Thus, for example, if there is no saturating current applied to any of the suppression wires of the core 1 at the time that the driver signal is applied to that core, the driver signal will be coupled through the core to the output winding $O_1$. However, if one or more of the suppression wires are active so that that particular core is saturated, the application of a driver signal to the core will not cause any change in flux in the core and, consequently, there will be no output signal induced in the output winding $O_1$.

In actual operation, the sequencer of the computer must be capable of providing a wide variety of operations which may be selectively varied or conditionally varied, depending upon the status of a particular program at a particular instant. Thus, it may be desirable to sequentially step through a series of cores; that is, selected cores are sequentially switched to a non-saturated state so that a driver signal can pass through the core to the output. Further, it may be desirable to have certain repetitive operations which will continue to take place until a predetermined condition occurs or until there is manual intervention. Further, the sequencer must be capable of selectively providing sub-routines or sub-sequences either automatically or conditionally in accordance with the status of the switches associated therewith.

In order to illustrate the manner in which this may be implemented in actual practice, the windings in the cores have been arranged in FIGURE 5 so that a predetermined sequence may be traced through the cores. For purposes of illustration, it is assumed that the first input for the sequence to be described hereinafter is a manual input, as by way of the manual register 60 illustrated in FIGURE 4. The manual register is assumed to be set such that the $A^0$, $B^1$, $C^0$, $D^1$ and $E^0$ suppress wires are all energized. Thus, since none of these wires thread the core 1, when a driver signal applies a switching signal to the core 1, there will be an output signal induced into the output winding $O_1$. The output signal from the wire $O_1$ may be used in the desired manner by the logic associated with the registers illustrated in FIGURE 3. A typical manual order for starting a routine might well be one which would, in effect, call out an order to be performed in a program, with the order being called out from the memory.

When the core 1 fires, the switching of the core will be sensed by the sense wires and amplifiers $S_A$ and $S_C$. The outputs of these two amplifiers $A_C$ and $C_C$ are applied to the complementing inputs of the flip-flops A and C, such that now the flip-flop $A_{FF}$ will be reversed so that the output $A^1$ will be active. The flip-flop $C_{FF}$ will also be reversed so that the output $C^1$ will be active. The sense wires which will be active across the array will now be $A^1$, $B^1$, $C^1$, $D^1$ and $E^0$. When the next driver signal is applied upon the occurrence of the next clock signal, the core 2 will be able to switch inasmuch as this core will not have any saturating current applied thereto. Consequently, an output signal will be induced into the output winding $O_2$, as well as on the output winding $O_1$. Once again, certain logical manipulations may be performed within the computer and the apparatus will be conditioned for the next clock pulse. This further conditioning will be effected by the inducing of a signal in the sense winding and amplifiers $S_B$ and $S_D$. The amplifier $S_B$ produces the signal $B_C$ which will complement the $B_{FF}$ flip-flop. Similarly, the flip-flop $D_{FF}$ will be complemented. The result of this complementing will be to apply to the sequencer signals which will permit the core 3 to switch upon the application of the driver signal.

When the core 3 fires, there will be complementing signals generated in the sense winding and amplifier circuits $S_B$, $S_D$, and $S_E$. The effect of this will be to switch all of the flip-flops $A_{FF}$ through $E_{FF}$ so that their output suppress wires $A^1$ through $E^1$ are all active. Under these conditions, the core 15 will be in a non-saturated state such that the application of the driver signal thereto will cause the core to switch and a signal will be induced in the output winding $O_{15}$. The core 15, in the present circuit, may be termed the terminal core for a particular sequence, and one which is effective within the logic of the system to transfer to the sequencer a new-order-operation code by way of the transfer circuits M shown on FIGURE 3, and the transfer circuits illustrated in FIGURE 4. The transfer of the new operation code will in turn set up a new set of conditions within the suppression flip-flops A through E.

For purposes of explanation, it is assumed that the new operation code is received which will be effective to select core 8, the next core in the sequence which is not saturated at the time that the driver signal is applied thereto. The code for this in terms of the setting of the suppress wires will be $A^0$, $B^0$, $C^1$, $D^1$ and $E^1$. When the core 8 fires, there will be complementing of the flip-flop $A_{FF}$ so that the next core conditioned in sequence will be core 9. By complementing the A flip-flop, the B flip-flop and the E flip-flop upon the firing of the core 9, the next core selected will be the core 10. By complementing the A flip-flop and the E flip-flop upon the firing of the core 10, the next core selected will be the core 15, which in turn will call for a new operation code from the computer.

Under certain operative conditions, it may be desired to perform a sub-sequence or a sub-routine at a particular point in the program. For purposes of illustration, the present sequencer has been arranged with what may be termed a trace sub-sequence which is called into operation immediately prior to the firing of the core which would bring in a new operation code. For this purpose, there has been provided a trace flip-flop $T_{FF}$ which is adapted to be under the control of manual switches 62 and 64. These switches are effective when the trace mode of operation is to be brought into effect to set the trace flip-flop $T_{FF}$ so that initially the output suppress wire T will be energized. It will be noted that the T suppress wire threads only the core 15. Core 14 is the only other core utilized in this suppress mode in the form illustrated, and this core will receive a saturating signal when the wire T is energized.

It should be noted that the suppress wire combination for the core 15 is the same as the core 14 insofar as the flip-flops A through E are concerned. The only difference lies in the flip-flop $T_{FF}$. In the event the $T_{FF}$ flip-flop has been activated by the closing of the switches 62 and 64, and the foregoing operations have been initiated, the starting of the program in core 1, and the stepping of the core to core 2 and then to core 3, will perform the program steps in the normal manner. However, instead of stepping into core 15 to call in a new operation code, the presence of a saturating signal on the core 15, and of no saturating signal on the core 14, will cause the core 14 to be selected. The selection of core 14 will bring into effect a sub-sequence routine which, in the present sequencer, is defined as a routine involving the switching of cores 4, 5, 6 and 7, in that order. This switching may be traced by noting that when the core 14 fires, the complementing effected will be such as to select the core 4 as the next core in the sequence which will be able to fire when the driver signal is applied. The selection will continue through cores 5, 6 and 7, and the complementing signals derived from the core 7 will, in this instance, once again select the suppress wires which would normally select the core 15. The core 15 will be selected in this instance for the reason that when the core 15 fires, the sense winding and amplifier $S_T$ are effective to complement the trace flip-flop $T_{FF}$ so that now the suppress wire active will be the wire T.

With the core 15 firing, a new operation code can be called in which may well be, in the foregoing example, a code which will select the core 8. At the same time that the core 15 switches, it will also apply a signal to the sense wire and amplifier $S_T$ so that a complementing signal will be applied to the trace flip-flop $T_{FF}$. Thus, when the core selection comes up for terminating the selected sequence, the sub-sequence routine by way of core 14 will be initiated. This operation may be continued for as long as it is desired to perform the sub-routine or sub-sequence.

When the next operation code is called in from the central processor, it is assumed that the core 16 is selected. In this instance, it is desired to go through a sequencing routine of a repetitive nature which is conditional in the way in which the repetition is effected. The cores selected in the sequence established by the selection of the core 16 will include the sequential selection of the core 16, 17, 18, and will then again repeat, going to core 16, 17, and 19. From this arrangement of the cores, it will be seen that a series of cores may be cyclicly and repetitively scanned in a sequence. In order to get out of a particular sequence, a system-derived control signal may be generally within the register circuits to indicate that a particular repetitive operation has been completed so that, for example, the core 15 may be energized or another core in the sequence, such as core 20, can be energized which, upon selection, may then in turn step to the core 15.

Within the recycling change set up in the illustrated sequencing circuit, it is essential to alternately select the cores 18 and 19 in the sequence. This alternate selection may well be arranged so that the fact that core 18 was scanned on one cycle is remembered until such time as the core 19 is fired, in which case this fact is remembered so that on the next cycle the core 18 will not fire. This memory of the status of the cycle may be effected by way of one of the flip-flops of the combination and the appropriate selection of the wires associated therewith.

Considering this conditional selection, it will be noted that when the selection or suppress wires $A^1$, $B^0$, $C^0$, $D^0$ and $E^1$ are energized, the core 18 will be selected. It will be noted that when the core 18 is selected, there will be a complementing of the flip-flop $D_{FF}$ and the flip-flop $E_{FF}$. The effect of this complementing will be to select core 16 in the sequence and to store the fact that core 18 has fired. The next time that the apparatus steps from the core 16 and 17, and the flip-flop $A_{FF}$ is complemented from the firing of the core 17, the core 19 will be selected, since this core will not have any saturating current applied thereto by the flip-flop $E_{FF}$.

Cores 11, 12 and 13 may be arranged to provide an output when certain input combinations are active by way of the suppress wires, and may be active at the same time that other cores in the sequencer are active.

It will be noted that the foregoing selection and memory has been achieved without a sacrifice in the overall operation of the circuit and without the requirement of additional circuitry other than what is normally provided for the sequencer. It should further be noted that this illustrated version of the sequencer may have the principle thereof expanded manifold times for a practical application to a computer system. Thus, in one embodiment of the invention, over seven hundred core devices were utilized in implementing the sequencer, and these core devices and their output windings were arranged to provide a very high degree of flexibility in terms of the operations which could be selected within the central computer. The flexibility which may be achieved within the sequencer permits great simplification and standardization of the logic within the central computer, thus providing a ready facility for the changing of the order structure of the computer by the mere substitution of another sequencer.

While, in accordance with the provisions of the statutes, there has been illustrated and described the best forms of the invention known, it will be apparent to those skilled in the art that changes may be made in the apparatus described within departing from the spirit of the invention as set forth in the appended claims and that, in some cases, certain features of the invention may be used to advantage without a corresponding use of other features.

Having now described the invention, what is claimed as new and novel and for which it is desired to secure by Letters Patent is:

1. A sequentially programmed computer apparatus adapted to perform a plurality of separate and distinct functions in an ordered manner, said apparatus comprising a data manipulator having predetermined fixed logic included therein, said logic comprising a plurality of fixed electrical circuits each of which includes a plurality of independently connected means for selectively connecting a corresponding number of inputs thereto, said last-named means being effective when activated by unique combinatorial codes to enable the selection of one or more of said logic circuits at any one instant, and means connected to said logic to variably select combinations thereof to perform selected orders, said last named means comprising a single sequencer operable when activated to perform a plurality of sequential steps during successive operative cycles, and feedback means interconnecting said logic and said single sequencer whereby signals generated within said fixed logic of said data manipulator are effective in initiating each of said plurality of sequential steps.

2. A sequentially programmed computer apparatus adapted to perform a plurality of separate and distinct functions in an ordered manner, said apparatus comprising a data manipulator having predetermined fixed logic included therein, said logic comprising a plurality of fixed electrical circuits each of which includes a plurality of independently connected means for selectively connecting a corresponding number of inputs thereto, said last-named means being effective when activated by unique combinatorial codes to enable selection of one or more of said logic circuits at any one instant, selection means including unique combinatorial code representing means connected to said logic to variably select combinations thereof to perform selected orders, said selection means comprising a single sequencer having a plurality of outputs, each of which is uniquely associated with said logic circuits and connected thereto in selective combination, feedback means for selectively connecting output signals from said fixed logic as inputs to said single sequencer to generate a change in the sequencer output each time a selected logic circuit combination has been activated.

References Cited

UNITED STATES PATENTS

| | | | |
|---|---|---|---|
| 3,034,101 | 5/1962 | Loewe | 340—172.5 |
| 3,042,305 | 7/1962 | Edwards et al. | 235—157 |
| 3,067,290 | 12/1962 | Greenaway et al. | 340—172.5 X |
| 3,067,937 | 12/1962 | Hinkein et al. | 235—157 |
| 3,153,223 | 10/1964 | Ord | 340—172.5 |

ROBERT C. BAILEY, *Primary Examiner.*

PAUL J. HENON, *Examiner.*